United States Patent
Tian et al.

(10) Patent No.: US 12,040,854 B2
(45) Date of Patent: Jul. 16, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Wenqiang Tian, Guangdong (CN); Wenhong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 41 days.

(21) Appl. No.: 17/843,094

(22) Filed: Jun. 17, 2022

(65) Prior Publication Data
US 2022/0329293 A1    Oct. 13, 2022

Related U.S. Application Data

(63) Continuation of application No. PCT/CN2019/128040, filed on Dec. 24, 2019.

(51) Int. Cl.
*H04B 7/04*    (2017.01)
*H04B 7/0413*    (2017.01)
*H04L 5/14*    (2006.01)
*H04W 76/15*    (2018.01)
*H04W 84/04*    (2009.01)

(52) U.S. Cl.
CPC ......... *H04B 7/0413* (2013.01); *H04L 5/1438* (2013.01); *H04W 76/15* (2018.02); *H04W 84/045* (2013.01)

(58) Field of Classification Search
CPC ... H04B 7/0413; H04B 7/0417; H04L 5/1438; H04W 76/15; H04W 84/045
USPC .................. 375/219, 262, 267, 299, 347–349
See application file for complete search history.

(56) References Cited

U.S. PATENT DOCUMENTS

| 2012/0182950 | A1  | 7/2012 | Chung et al. |
| 2014/0192927 | A1* | 7/2014 | Kim ............... H04B 7/0689 375/299 |
| 2015/0003419 | A1* | 1/2015 | Li ..................... H04W 52/40 370/329 |

(Continued)

FOREIGN PATENT DOCUMENTS

| CN | 101291271 A | 10/2008 |
| CN | 102271412 A | 12/2011 |

(Continued)

OTHER PUBLICATIONS

International Search Report with English Translation for PCT Application PCT/CN2019/128040 mailed Sep. 9, 2020. (4 pages).

(Continued)

*Primary Examiner* — Emmanuel Bayard
(74) *Attorney, Agent, or Firm* — Young Basile Hanlon & MacFarlane, P.C.

(57) ABSTRACT

Provided in the implementations of the present disclosure are a wireless communication method, a terminal device and a network device, capable of achieving OAM based wireless communications. The wireless communication method includes: the terminal device determining to use a first transmission mode to transmit data, wherein the first transmission mode is a MIMO or OAM based transmission mode.

18 Claims, 7 Drawing Sheets

(56) References Cited

U.S. PATENT DOCUMENTS

| | | | |
|---|---|---|---|
| 2017/0117626 A1 | 4/2017 | Sajuyigbe et al. | |
| 2017/0359105 A1* | 12/2017 | Huang | H04L 1/0026 |
| 2018/0124816 A1* | 5/2018 | Han | H04L 1/1893 |
| 2018/0234139 A1 | 8/2018 | Djordjevic et al. | |
| 2020/0059953 A1* | 2/2020 | Liu | H04W 72/21 |
| 2021/0298045 A1* | 9/2021 | Kim | H04W 72/0453 |

FOREIGN PATENT DOCUMENTS

| | | |
|---|---|---|
| CN | 105790814 A | 7/2016 |
| CN | 106899970 A | 6/2017 |
| WO | 2018058563 A1 | 4/2018 |
| WO | 2019189706 A1 | 10/2019 |

OTHER PUBLICATIONS

Written Opinion of the International Search Authority with English Translation for PCT Application PCT/CN2019/128040 mailed Sep. 9, 2020. (9 pages).

3GPP TSG-RAN WG4#57AH, R4-110206, Austin, USA, Qualcom Incorporated, UE Capabilities for UL MIMO, Jan. 17-Jan. 21, 2011. (2 pages).

Zhang et al., New Degrees of Freedom for Beamforming Manipulation in MIMO Transmission with OAM, Institute of Electrical and Electronics Engineers, 2019. (6 pages).

Extended European Search Report for EP Application 19957360.1 mailed Nov. 28, 2022. (12 pages).

\* cited by examiner

WIRELESS COMMUNICATION METHOD, TERMINAL DEVICE AND NETWORK DEVICE

CROSS-REFERENCE TO RELATED APPLICATION(S)

The present application is a continuation application of International PCT Application No. PCT/CN2019/128040, filed on Dec. 24, 2019, the entire content of which is hereby incorporated by reference.

TECHNICAL FIELD

Implementations of the present disclosure relate to the field of communication, and more specifically, to a wireless communication method, a terminal device, and a network device.

BACKGROUND

With the development of communication technology, it is possible to conduct Orbital Angular Momentum (OAM) based wireless communication under some particular scenarios. However, there is no clear way capable of achieving it.

SUMMARY

Implementations of the application provide a wireless communication method, a terminal device and a network device, capable of achieving OAM based wireless communications.

In a first aspect, a wireless communication method is provided, which includes:
  a terminal determines to use a first transmission mode to transmit data, wherein the first transmission mode is a MIMO or OAM based transmission mode.

In a second aspect, a wireless communication method is provided, wherein the method includes:
  a network device determines that a terminal device uses a first transmission mode to transmit data, wherein the first transmission mode is a MIMO or OAM based transmission mode.

In a third aspect, a terminal device is provided, configured to perform the method in the first aspect described above or various implementations thereof.

Specifically, the terminal device includes a function module, configured to perform the method in the first aspect described above or various implementations thereof.

In a fourth aspect, a network device is provided, configured to perform the method in the second aspect described above or various implementations thereof.

Specifically, the network device includes a function module, configured to perform the method in the second aspect described above or various implementations thereof.

In a fifth aspect, a terminal device is provided, which includes a processor and a memory. The memory is configured to store a computer program, and the processor is configured to call and run the computer program stored in the memory to perform the method in the first aspect or in various implementations thereof.

In a sixth aspect, a network device is provided, which includes a processor and a memory. The memory is configured to store a computer program, and the processor is configured to call and run the computer program stored in the memory to perform the method in the second aspect or various implementations thereof.

In a seventh aspect, an apparatus is provided, which is configured to implement the method in any one of the first and second aspects described above or various implementations thereof.

Specifically, the apparatus includes a processor configured to call and run a computer program from a memory to enable a device in which the apparatus is installed to perform the method in any one of the above first and second aspects or various implementations thereof.

In an eighth aspect, a computer readable storage medium is provided, which is configured to store a computer program that enables a computer to perform the method in any one of the first and second aspects or various implementations thereof.

In a ninth aspect, a computer program product is provided, including computer program instructions that enable a computer to perform the method in any one of the above first and second aspects or various implementation thereof.

In a tenth aspect, a computer program is provided, when the computer program is run on a computer, the computer program enables the computer to perform the method in any one of the first and second aspects or various implementations thereof.

According to the above technical solution, when a MIMO based transmission mode and an OAM based transmission mode coexist, a data transmission mode can be determined.

DETAILED DESCRIPTION

Technical solutions in the implementations of the present disclosure will be described below with reference to the accompanying drawings in the implementations of the present disclosure. It is apparent that the implementations described are just a part of the implementations of the present disclosure, rather than all of the implementations of the present disclosure. According to the implementations of the present disclosure, all other implementations achieved by a person of ordinary skills in the art without paying inventive efforts shall be covered by the protection scope of the present disclosure.

The implementations of the present disclosure may be applied to various communication systems, such as a Global System of Mobile Communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next generation communication system, or another communication system.

Generally speaking, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), or Vehicle to Vehicle (V2V) communication, etc., and the implementations of the present disclosure may also be applied to these communication systems.

Optionally, the communication system in the implementations of the present disclosure may be applied to a Carrier Aggregation (CA) scenario, or a Dual Connectivity (DC) scenario, or a Standalone (SA) network deployment scenario.

Implementations of the present disclosure do not limit frequency spectrums applied. For example, implementations of the present disclosure may be applied to a licensed spectrum, or an unlicensed spectrum.

Figure 1:
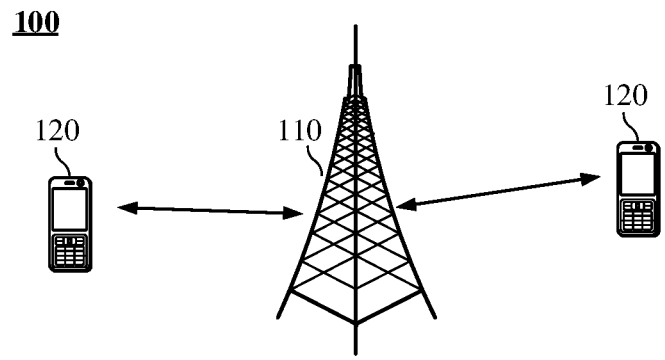
FIG. 1 is a schematic diagram of architecture of a communication system according to an implementation of the present disclosure.

Illustratively, a communication system 100 to which an implementation of the present disclosure is applied is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area.

FIG. 1 illustrates one network device and two terminal devices. Optionally, the communication system 100 may include multiple network devices, and other quantity of terminal devices may be included within the coverage area of each network device, which is not limited in the implementations of the present disclosure.

Optionally, the communication system 100 may also include another network entity, such as a network controller, a mobile management entity, etc., which is not limited in the implementations of the present disclosure.

It should be understood that a device with a communication function in a network/system in the implementations of the present disclosure may also be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. The communication devices may also include other devices in the communication system 100, for example other network entities, such as network controllers and mobile management entities, which is not limited in the implementations of the present disclosure.

It should be understood that the terms "system" and "network" are often used interchangeably herein. The term "and/or" herein refers to an association relationship describing associated objects only, which indicates that three relationships may exist, for example, A and/or B may indicate three cases: A alone, both A and B at the same time, and B alone. In addition, the symbol "/" herein generally indicates that objects before and after the symbol "/" have an "or" relationship.

Various implementations of the present disclosure are described in combination with a terminal device and a network device, wherein the terminal device may also be referred to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus, etc. The terminal device may be a STATION (ST) in the WLAN, a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a next generation communication system, such as, a terminal device in an NR network, or a terminal device in a future evolved Public Land Mobile Network (PLMN), etc.

By way of an example but not a limitation, in an implementation of the present disclosure, the terminal device may also be a wearable device. The wearable device may also be referred to a wearable intelligent device, which is a general term of wearable devices developed by an intelligent design of daily wear applying wearing technology, e.g., glasses, gloves, a watch, clothing, or shoes, etc. The wearable device is a portable device that is worn directly on a body, or integrated into the clothes or accessories of a user. The wearable device is not only a hardware device, but also realizes powerful functions through software support, as well as data interaction or cloud interaction. Generalized wearable smart devices include devices that are full functioned, large sized, and may realize complete or partial functions without relying on smart phones, such as a smart watch, or smart glasses, etc., and include devices that only focus on a certain kind of application functions, and need to be used in conjunction with other devices such as smart phones, such as various smart bracelets, smart jewelry, or the like, for monitoring physical signs.

A network device may be a device for communicating with a mobile device, or may be an Access Point (AP) in a WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, as well as a network device or a gNB in an NR network, or a network device in a future evolved PLMN network, etc.

In an implementation of the present disclosure, a network device provides a service for a cell, and a terminal device communicates with the network device through a transmission resource (e.g., a frequency domain resource, or called a spectrum resource) used by the cell, wherein the cell may be a cell corresponding to the network device (e.g., a base station), and may belong to a macro base station, or may be a base station corresponding to a Small cell. The Small cell here may include: a Metro cell, a Micro cell, a Pico cell, or a Femto cell, etc. These Small cells have characteristics of a small coverage range and a low transmission power, and are suitable for providing high-speed data transmission services.

At present, the wireless communication system is of a data transmission mode based on Multiple-Input Multiple-Output (MIMO). As the most important supporting technology of the physical layer of 4G and 5G communication systems, after spatial multiplexing, transmit diversity, beamforming and multi-user MIMO are introduced in the release 8 (Rel-8), the evolution and enhancement of MIMO technology is an important task of the communication system in each subsequent release.

In the specific MIMO related design, reference signal design with Demodulation Reference Signal (DMRS), Channel State Information Reference Signal (CSI-RS), Phase Tracking Reference Signal (PT-RS), Sounding Reference Signal (SRS) as the representative, channel state information feedback design with codebook and non-codebook feedback as the representative, beam management design, etc. are the key points of MIMO research. In actual systems, the above designs also affect the configuration of system parameters and the execution of system flow respectively.

The design of wireless communication system based on orbital angular momentum is a new type of wireless communication technology research different from traditional MIMO. The research of orbital angular momentum originated in the field of optical communication. Later, some researchers proposed to apply orbital angular momentum of quantum state to low frequency and generate eddy electromagnetic waves through large-scale antennas, thus achieving the application of orbital angular momentum in the field of wireless communication. At present, compared to the wireless communication mode based on traditional MIMO, firstly, the communication mode based on orbital angular momentum is easier to be achieved for the same high-speed transmission. Secondly, the communication mode based on orbital angular momentum can meet the demand of higher rate transmission through the specific antenna and RF system design.

MIMO based communication mode is the basis of the existing communication system, while the emerging OAM based communication mode is a relatively advanced research content, for its potential advantages such as high speed and low complexity can become the supporting technology for further improving the performance of future wireless communication systems.

Considering factors such as the further improvement of the performance of the future communication system and the maximum reduction of the complexity, it is necessary to introduce the OAM based communication mode into the future communication system. A problem at this time is that the base station needs to determine the communication mode to be selected on demand or according to their respective implementation algorithms. Correspondingly, the network side and the terminal side need to have a consistent understanding of the communication mode adopted. Only in this way, the effective and efficient data transmission between the network side and the terminal side in the future communication system can be ensured, preventing the problem of communication failure caused by differences in understanding of communication modes.

In addition, the use of OAM technology as one of the future communication modes also faces a problem that not all devices support OAM capabilities. For example, when the MIMO based communication mode is the basic communication mode, some terminal device may not simultaneously support the OAM capability due to cost. It is foreseeable that for a considerable period of time, there will be a large number of devices that support the OAM capability and devices that do not support the OAM capability coexist in the entire communication system. In this case, from the perspective of a communication system, how to provide corresponding service types for different types of devices to further improve user experience and overall network performance will be a problem that needs to be studied and solved.

Figure 2:
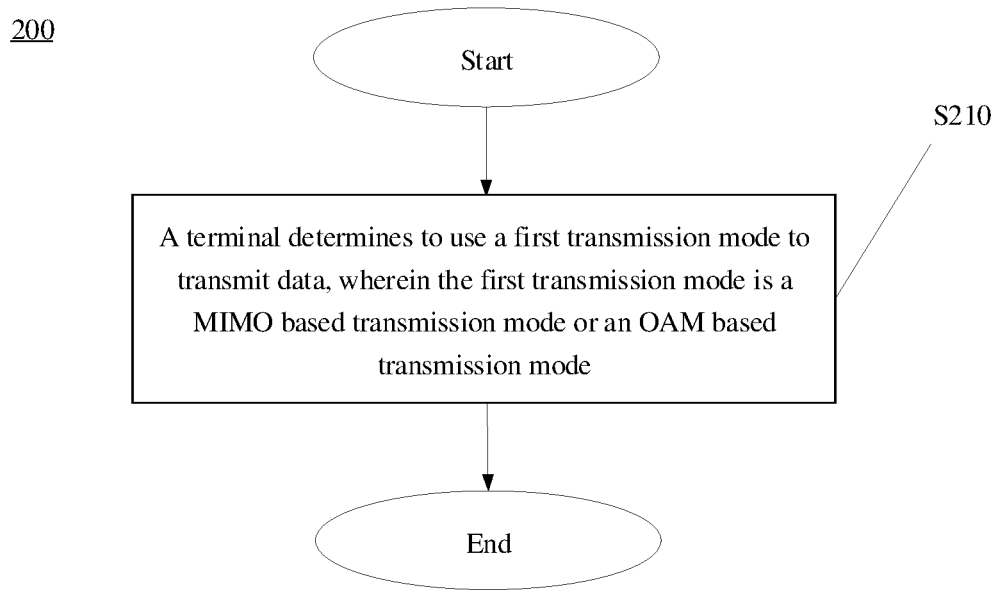
FIG. 2 is a schematic flow chart of a wireless communication method according to an implementation of the present disclosure.

FIG. 2 is a schematic flowchart of a wireless communication method 200 according to an implementation of the present disclosure. As shown in FIG. 2, the method 200 includes following contents.

In S210, a terminal determines to use a first transmission mode to transmit data, wherein the first transmission mode is a MIMO based transmission mode or an OAM based transmission mode.

In other words, in an implementation of the present disclosure, in the case that the MIMO based transmission mode and the OAM based transmission mode coexist, the terminal device determines to use the first transmission mode to transmit data.

In some implementations, the terminal device may determine to use the first transmission mode to transmit data based on the indication or configuration by the network device. In other implementations, the terminal device may determine to use the first transmission mode to transmit data based on its own implementation, and report the first transmission mode to the network device.

Optionally, in some implementations, the terminal device may determine to use the first transmission mode to transmit data based on the indication by the network device.

Specifically, as Example 1, the terminal device receives first information sent by the network device, wherein the first information is used to indicate the first transmission mode or a transmission parameter type corresponding to the first transmission mode. Further, the above act S210 may specifically be that the terminal device determines to use the first transmission mode to transmit data according to the first information.

Optionally, in Example 1, the terminal device may determine transmission parameters corresponding to the first transmission mode based on the indication by the network device.

Specifically, the terminal device receives the second information sent by the network device, and the second information is used to indicate the transmission parameters corresponding to the first transmission mode. Further, the terminal device determines the transmission parameters corresponding to the first transmission mode according to the second information.

For example, the first transmission mode is a MIMO based transmission mode, and the transmission parameters corresponding to the first transmission mode may be Modulation and Coding Scheme (MCS) information, etc.

For another example, the first transmission mode is an OAM based transmission mode, and the transmission parameters corresponding to the first transmission mode may be modulation order, phase information, etc.

Optionally, in Example 1, the terminal device analyzes the second information according to the first information.

Optionally, the first information and the second information are carried in the same signaling or broadcast message.

Optionally, the first information and the second information are carried in different signaling or broadcast messages respectively.

Optionally, the first information is carried in a broadcast message or in at least one of Media Access Control Control Element (MAC CE), Downlink Control Information (DCI), Radio Resource Control (RRC).

Optionally, the second information is carried in a broadcast message, or the second information is carried in at least one of MAC CE, DCI and RRC signaling.

It should be noted that the above broadcast message may be a Master Information Block (MIB), a System Information Block (SIB) 1 or other SIB messages.

For example, in Example 1, for the network side, the network device carries the first information through DCI 1. Specifically, the network device may indicate the first transmission mode through at least one bit of information in DCI, or indicate the transmission parameter type corresponding to the first transmission mode. Then, the network device carries the second information through DCI. Specifically, the network device may indicate the transmission parameters corresponding to the first transmission mode through N-bits information in DCI 2, where N is an integer greater than 1. For the terminal side, when the terminal device receives DCI 1, the terminal device can first determine the first transmission mode or the transmission parameter type corresponding to the first transmission mode through the first information, that is, the at least one bit of information. For example, "0" indicates the OAM based transmission mode or the transmission parameter type corresponding to the OAM based transmission mode, and "1" indicates the MIMO based transmission mode or the transmission parameter type corresponding to the MIMO based transmission mode. Then, the terminal device analyzes and determines the transmission parameters corresponding to the first transmission mode according to the determined first transmission mode or the transmission parameter type corresponding to the first transmission mode. In addition, it should be noted that DCI 1 and DCI 2 may also be one DCI message.

Optionally, in Example 1, the terminal device determines, according to the first information, valid or activated transmission parameters in the first type of transmission parameters and the second type of transmission parameters configured at the terminal device as the transmission parameter type corresponding to the first transmission mode, wherein the first type of transmission parameters are for the OAM based transmission mode and the second type of transmission parameters are for the MIMO based transmission mode.

That is, the first type of transmission parameters and the second type of transmission parameters may be pre-configured at the terminal device. For example, the terminal device receives the third information sent by the network device, the third information is used to configure the first type of transmission parameters and the second type of transmission parameters. That is, the network device may pre-configure the first type of transmission parameters and the second type of transmission parameters at the terminal device. In addition, it should be noted that the first type of transmission parameters and the second type of transmission parameters may be configured by one message or different messages.

Optionally, in some implementations, the transmission parameters configured at the terminal device are part of the first type of transmission parameters, and/or the transmission parameters configured at the terminal device are part of the second type of transmission parameters.

That is, a part of the first type of transmission parameters and/or a part of the second type of transmission parameters may be pre-configured at the terminal device. For example, the terminal device receives the third information sent by the network device, the third information is used to configure a part of the first type of transmission parameters and/or a part of the second type of transmission parameters. That is, the network device may pre-configure a part of the first type of transmission parameters and/or a part of the second type of transmission parameters at the terminal device.

Optionally, after the sending the first information to the terminal device, the network device may also send second information to the terminal device, wherein the second information is used to indicate another part of transmission parameters of the transmission parameter type corresponding to the first transmission mode.

Optionally, the third information is carried in a broadcast message or the third information is carried in at least one of MAC CE signaling, DCI and RRC signaling.

Optionally, in some implementations, the terminal device may report to the network device whether it supports OAM based transmission mode or whether it has the ability to transmit data based on the first type of transmission parameters, such that the network device determines that the terminal device uses the first transmission mode to transmit data or determines the transmission parameters corresponding to the first transmission mode.

Specifically, the terminal device sends fourth information to the network device, the fourth information is used to indicate whether the terminal device supports the OAM based transmission mode, or whether the terminal device is capable of transmitting data based on the first type of transmission parameters, the first type of transmission parameters are for the OAM based transmission mode.

Optionally, the fourth information is carried in at least one of the following: capability report information, the first piece of information in two-step random access, the first or third piece of information in four-step random access, RRC dedicated signaling, and Uplink Control Information UCI.

Optionally, in some implementations, after determining to use the first transmission mode to transmit data, the terminal device may report the first transmission mode to the network device, so that the network device can configure the transmission parameters corresponding to the first transmission mode.

Specifically, the terminal device sends fifth information to the network device, wherein the fifth information is used to indicate that the terminal device determines to use the first transmission mode to transmit data, or the fifth information is used to indicate the terminal device transmits data based on the transmission parameter type corresponding to the first transmission mode.

Optionally, the terminal device receives the sixth information sent by the network device, which is used to indicate the transmission parameters corresponding to the first transmission mode.

Optionally, for the network side, in response to the fifth information, the network device sends the sixth information to the terminal device.

Optionally, the fifth information is carried in at least one of the following: capability report information, the first piece of information in two-step random access, the first or third piece of information in four-step random access, RRC dedicated signaling, and UCI.

Optionally, the sixth information is carried in a broadcast message or in at least one of MAC CE, DCI and RRC signaling.

Therefore, in an implementation of the present disclosure, the terminal device can determine the data transmission mode when the OAM based transmission mode and the MIMO based transmission mode coexist. In one aspect, it is ensured that the network side and the terminal side have consistent understanding of a data transmission mode and parameter configuration information in the future communication system, which prevents the communication failure caused by differences in understanding of communication modes. In another aspect, considering that there will be a large number of devices that support OAM capability and devices that do not support OAM capability coexist in the communication system, the corresponding service types are provided for different types of devices through the capability report mode that supports OAM, which improves the user experience and the overall network performance.

The wireless communication method 200 of an implementation of the present disclosure will be described in detail below through specific implementations.

In Implementation 1, a base station sends information 1 to a UE, which may be used to indicate the first transmission mode (or to indicate a transmission parameter type corresponding to the first transmission mode), and the UE determines to use the first transmission mode to transmit data according to the information 1. The base station sends information 2 to the UE, which is used to indicate transmission parameters corresponding to the first transmission mode (or parameters related to the parameter type corresponding to the first transmission mode). The first transmission mode is a MIMO based transmission mode or an OAM based transmission mode.

Optionally, in Implementation 1, the information 1 may be indicated by broadcasting, such as MIB, SIB1 or other SIB messages. The information 1 may also be indicated to the UE through RRC dedicated signaling, such as an RRC reconfiguration message. In addition, the information 1 may also be indicated to the UE by DCI or MAC CE.

Optionally, in Implementation 1, the information 2 may be indicated by broadcasting, such as MIB, SIB1 or other SIB messages. The information 2 may also be indicated to the UE through RRC dedicated signaling, such as an RRC reconfiguration message. The information 2 may be indicated to the UE by DCI. The information may also be indicated to the UE by MAC CE.

Figure 3:
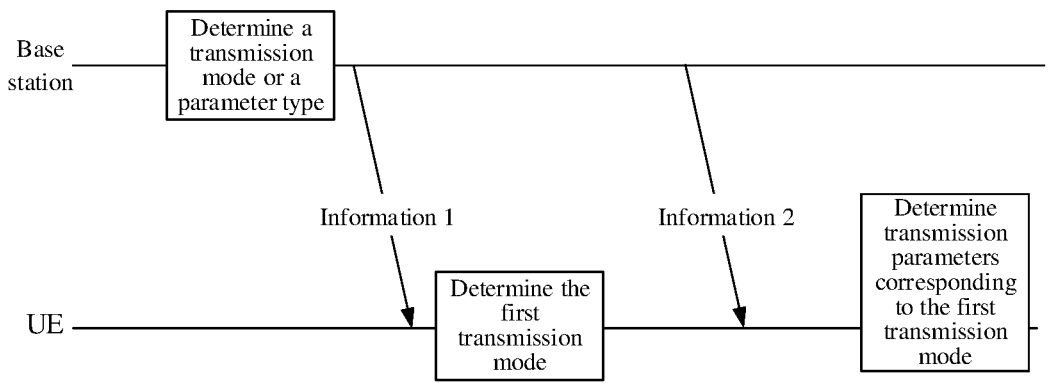
FIGS. 3 to 10 are schematic diagrams for determining data transmission modes and corresponding transmission parameters according to implementations of the present disclosure.
Figure 4:
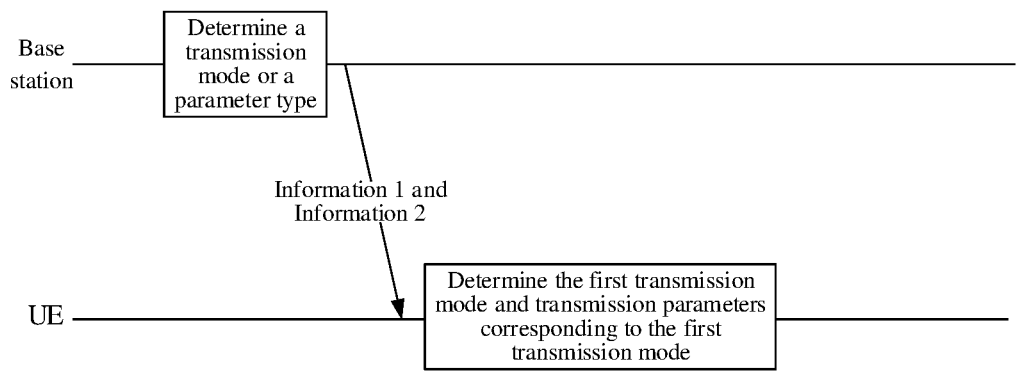

Optionally, in Implementation 1, as shown in FIG. 3, the information 1 and the information 2 may be respectively carried in different signaling or broadcast messages. As shown in FIG. 4, the information 1 and the information 2 may also be carried in the same signaling or broadcast message.

For example, in Implementation 1, for the network side, the base station carries the information 1 through DCI 1. Specifically, the base station may indicate the first transmission mode through at least one bit of information in DCI, or indicate the transmission parameter type corresponding to the first transmission mode. Then, the base station carries the information 2 through DCI. Specifically, the base station may indicate the transmission parameters corresponding to the first transmission mode through the N-bit information in DCI 1, where N is an integer greater than or equal to 1. For the UE side, when the UE receives DCI 1, the UE can first determine the first transmission mode or the transmission parameter type corresponding to the first transmission mode through the information 2, i.e., the at least one bit of information. For example, "0" indicates the OAM based transmission mode or the transmission parameter type corresponding to the OAM based transmission mode, and "1" indicates the MIMO based transmission mode or the transmission parameter type corresponding to the MIMO based transmission mode. Then, the UE analyzes and determines the transmission parameters corresponding to the first transmission mode according to the determined first transmission mode or the transmission parameter type corresponding to the first transmission mode. The transmission parameters corresponding to the first transmission mode may be MIMO based parameter information, such as MCS information, or the transmission parameters corresponding to the first transmission mode may be OAM based parameter information, such as modulation order and phase information.

Figure 5:
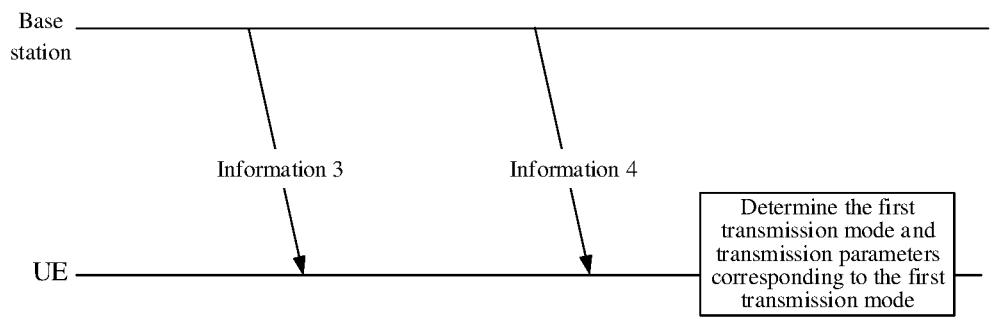

In Implementation 2, as shown in FIG. 5, the base station sends information 3 to the UE, which is used to indicate or configure the first type of transmission parameters and/or the second type of transmission parameters, wherein the first type of transmission parameters is for the OAM based transmission mode and the second type of transmission parameters is for the MIMO based transmission mode. The first type of transmission parameters and/or the second type of transmission parameters include reference signal related configuration parameters, beam management related configuration parameters and channel estimation related configuration parameters, etc., involved in channel estimation. The base station sends information 4 to the UE, which is used to indicate the first transmission mode (or to indicate the parameter type corresponding to the first transmission mode). When the information 4 indicates the OAM based transmission mode or the first type of transmission parameters, the first type of transmission parameters are valid or activated. When the information 4 indicates the MIMO based transmission mode the second type of transmission parameters, the second type of transmission parameters are valid or activated.

Optionally, in Implementation 2, the information 3 may be indicated by broadcasting, such as MIB, SIB1 or other SIB messages. The information 3 may also be indicated to the UE through RRC dedicated signaling, such as an RRC reconfiguration message. In addition, this information 3 may also be indicated to the UE by DCI or MAC CE.

Optionally, in Implementation 2, the information 4 may be indicated by broadcasting, such as MIB, SIB1 or other SIB messages. The information 4 may also be indicated to the UE through RRC dedicated signaling, such as an RRC reconfiguration message. The information 4 may be indicated to the UE by DCI. The information 4 may also be indicated to the UE by MAC CE.

For example, in Implementation 2, the base station configures the first type of transmission parameters and the second type of transmission parameters to the UE by RRC signaling (or broadcasting, such as SIB messages). The base station indicates the data transmission mode (or parameter type) currently adopted through information 4 carried in DCI (or MAC CE). Specifically, the base station can indicate the data transmission mode (or parameter type) currently adopted through at least one bit of information in DCI. On the UE side, the UE can obtain corresponding configuration parameters, such as MIMO related configuration parameters and OAM related configuration parameters, by receiving the first type of transmission parameters and the second type of transmission parameters. When the UE receives DCI (for example, DCI for data scheduling), the UE can first determine the current data transmission mode (or parameter type) through the information 3, i.e., the above at least one bit of information. For example, "0" indicates the OMA based transmission mode (the first type of transmission parameter) and "1" indicates the MIMO based data transmission mode (the second type of transmission parameter). Then, according to the determined data transmission mode (or parameter type), the UE determines whether the currently effective configuration parameter is a first type of transmission parameter or a second type of transmission parameter. It should be noted that the main difference between Implementation 2 and Implementation 1 is that the most important scenario described in Implementation 1 is that when data transmission is scheduled by DCI, the transmission mode (parameter type) of current transmission is indicated in DCI, and the corresponding parameters are obtained by analyzing DCI in a corresponding way. This can avoid occupying too many bits in DCI to indicate different transmission parameters corresponding to different transmission modes. The scenario of Implementation 2 mainly considers that besides DCI control information, there are still many scheduling related parameters that need to be configured in advance through RRC signaling. At this time, one method is to configure parameters as needed during RRC configuration, while another method is to configure both MIMO related configuration information and OAM related configuration information to UE during RRC configuration (that is, the function of information 3 above), and then indicate the current data transmission mode (or parameter type) as needed through MAC CE or DCI, and determine the currently available configuration information.

In Implementation 3, the UE sends information 5 to the base station, the information 5 is used to indicate whether the UE supports the first capability or whether the UE supports the OAM based transmission mode or parameter configuration, wherein the first capability refers to whether the UE can support the OAM based data transmission mode or parameter configuration.

A specific example described above is that the UE sends information 5 to the base station, which indicates that the UE supports the first capability, and the first capability refers to that the UE supports the OAM based data transmission mode or OAM related parameter configuration. When the UE indicates supporting the OAM based data mode, the UE can use OAM mode for data modulation and transmission, and correspondingly for OAM related reference signal configuration, channel estimation, channel measurement and beam management.

Optionally, in Implementation 3, the way for sending information 5 by UE includes: (1) the UE transmitting information 5 by using capacity reporting information; (2) the UE transmitting information 5 using random access procedure, such as a message (message A) sent by UE in two-step random access procedure, or a random access request (message 1) or the first uplink scheduling (message 3) sent by UE in four-step random access procedure; (3) the UE transmitting information 5 by using RRC dedicated signaling; and (4) the UE transmitting information 5 by using UCI.

Figure 6:
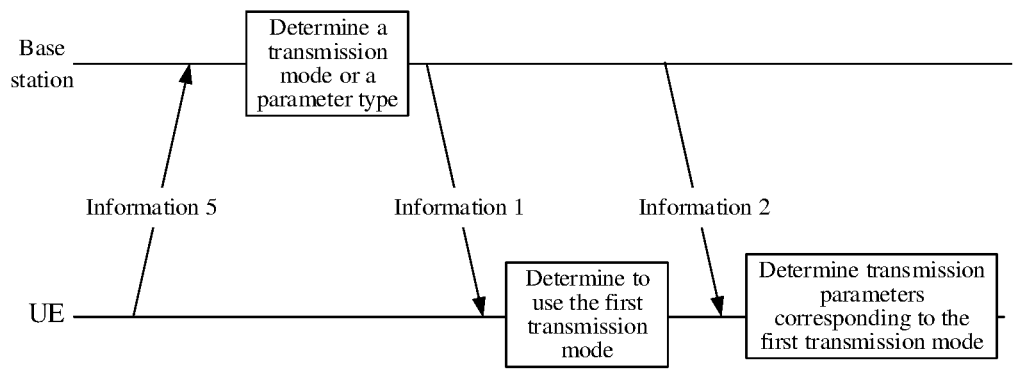
Figure 7:
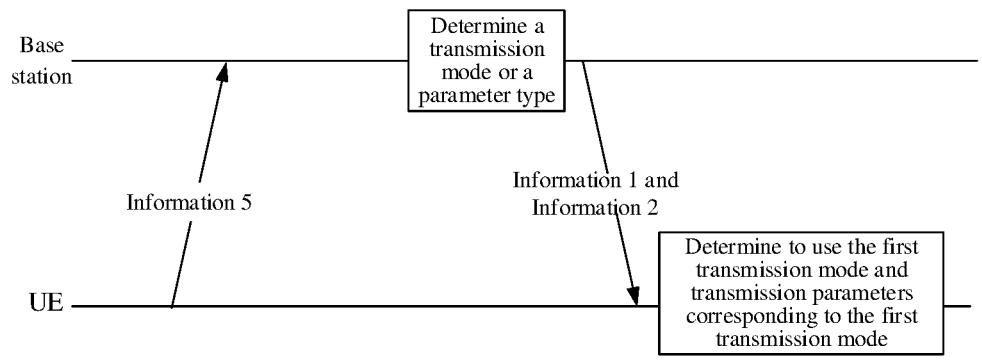
Figure 8:
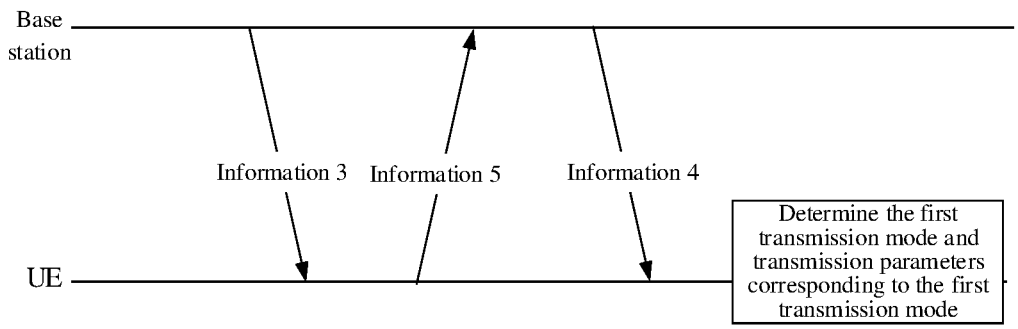

Optionally, in Implementation 3, the base station receives the information 5 sent by the UE, and the base station determines the data transmission mode (or parameter type). A particular example is that when the UE supports the OAM based data transmission mode, the base station may adopt the OAM based data transmission mode, indicate to adopt the OAM based data transmission mode, and configure corresponding parameters to the UE. Another specific example is that when the UE supports the OAM based data transmission mode, the base station may not adopt the OAM based data transmission mode, indicate to adopt the MIMO based data transmission mode, and configure corresponding parameters to the UE. Here, it is mainly considered to give the base station flexibility in data transmission configuration. For the specific way for indicating a transmission mode and configuring corresponding parameters corresponding to this implementation, please refer to the related descriptions in Implementation 1 and Implementation 2 above, as shown in FIGS. 6 to 8.

Figure 9:
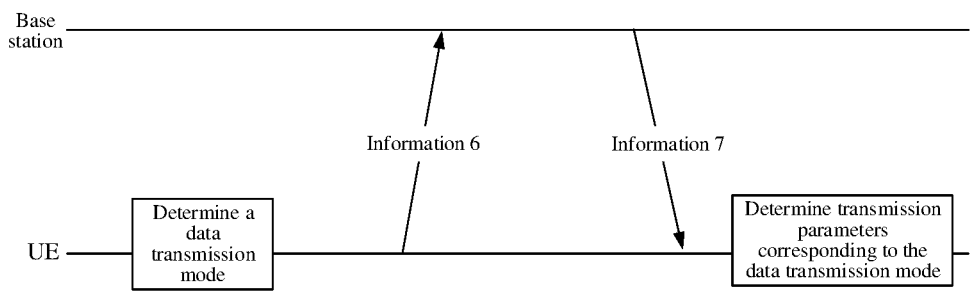

In Implementation 4, as shown in FIG. 9, the UE sends information 6 to the base station, the information 6 can be used to indicate the data transmission mode (or the parameter types related to the transmission mode), and the UE can determine the data transmission mode or a parameter type related to the data transmission mode based on the information 6. The base station sends information 7 to the UE, the information 7 indicates the parameters corresponding to the data transmission mode indicated by the information 6 (or the parameter types indicated by the information 6). The data transmission mode indicated by information 6 here is a MIMO based transmission mode or an OAM based transmission mode.

Optionally, in Implementation 4, when the UE needs to send data, the UE indicates the data transmission mode through UCI (information 6), and the UE can indicate the data transmission mode currently adopted through at least one bit of information in UCI, for example, "0" indicates the OAM based transmission mode and "1" indicates the MIMO based transmission mode. Then, the base station indicates the transmission parameters corresponding to the data transmission mode through N-bits information in DCI, where N is an integer greater than or equal to 1. The content of the parameters may be MIMO based parameter information, such as MCS information, or the content of the parameters may be OAM based parameter information, such as modulation order and phase information.

Optionally, in Implementation 4, the above way for sending information 6 by UE includes: (1) the UE transmitting information 6 by using capacity reporting information; (2) the UE transmitting information 6 by using random access procedure, such as a message (message A) sent by UE in two-step random access procedure, or a random access request (message 1) or the first uplink scheduling (message 3) sent by UE in four-step random access procedure; (3) the UE transmitting information 6 by using RRC dedicated signaling; and (4) the UE transmitting information 6 by using UCI.

Figure 10:
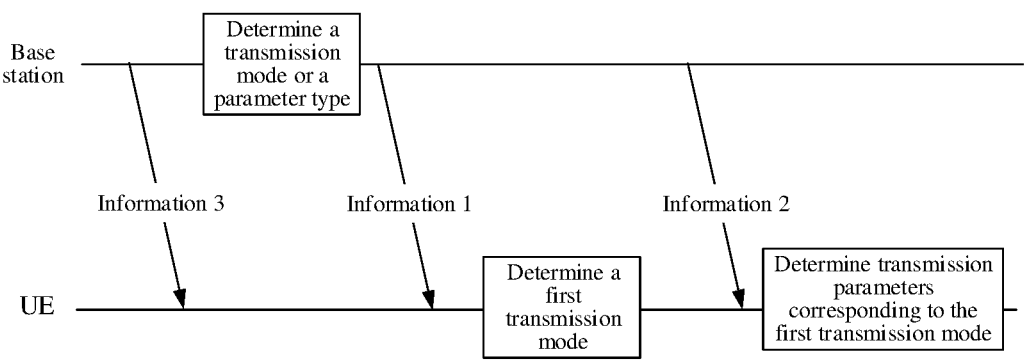

In Implementation 5, Implementation 1 and Implementation 2 may be used in combination. For example, as shown in FIG. 10, the above-mentioned information 3 may be configured with a part of OAM configuration information and MIMO configuration information through RRC, and the base station informs the UE that the transmission mode based on OAM is adopted through information 1, and then the UE determines that the OAM related configuration information in the previous configuration information is valid. In addition, the base station further indicates another part of OAM related configuration parameters to the UE through DCI carried information 2, and the UE determines that the information in DCI is analyzed as OAM related configuration parameters through information 1, and determines the above configuration parameters. This is just an example of a combination, and other forms of combination are not excluded. In addition, Implementation 1 and Implementation 2 may also be combined with Implementation 3 and Implementation 4, that is to say, the case of UE capability or UE indication may be added, and the specific combination mode will not be described again.

Therefore, in an implementation of the present disclosure, the data transmission mode can be determined when the MIMO based transmission mode and the OAM based transmission mode coexist.

In addition, in one aspect, it is ensured that the network side and the terminal side have consistent understanding of a data transmission mode and parameter configuration information in the future communication system, which prevents the communication failure caused by differences in understanding of communication modes. In another aspect, considering that there will be a large number of devices that support OAM capability and devices that do not support OAM capability coexist in the communication system, the corresponding service types are provided for different types of devices by means of capability reporting, which improves the user experience and the overall network performance.

The wireless communication method according to an implementation of the present disclosure is described in detail above from a perspective of the terminal device in connection with FIG. 2 to FIG. 10. Next, a wireless communication method according to another implementation of the present disclosure will be described in detail from a perspective of the network device in connection with FIG. 11. It should be understood that the description of the terminal device side corresponds to the description of the network device side, and the above text may be referred to for similar description, which will not be repeated here to avoid repetition.

Figure 11:
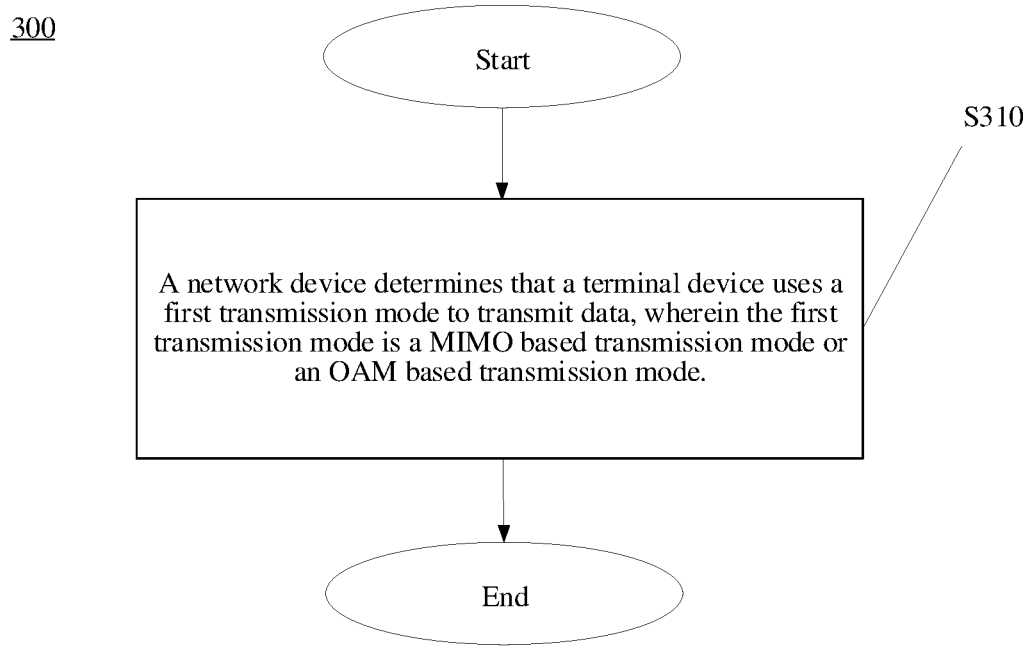
FIG. 11 is a schematic flow chart of another wireless communication method according to an implementation of the present disclosure.

FIG. 11 is a schematic flowchart of a wireless communication method 300 according to an implementation of the present disclosure. As shown in FIG. 11, the method 300 includes following contents.

S310, a network device determines that a terminal device uses a first transmission mode to transmit data, wherein the first transmission mode is a MIMO based transmission mode or an OAM based transmission mode.

Optionally, in some implementations, the method 300 further includes: the network device sending first information to the terminal device, wherein the first information is used to indicate the first transmission mode or a transmission parameter type corresponding to the first transmission mode.

Optionally, in some implementations, the method 300 further includes: the network device sending second information to the terminal device, wherein the second information is used to indicate the transmission parameters corresponding to the first transmission mode.

Optionally, in some implementations, the first information is further used by the terminal device to analyze the second information.

Optionally, in some implementations, the first information and the second information are carried in the same signaling or broadcast message.

Optionally, in some implementations, the first information and the second information are respectively carried in different signaling or broadcast messages.

Optionally, in some implementations, the first information is also used by the terminal device to determine valid or activated transmission parameters in a first type of transmission parameters and a second type of transmission parameter configured at the terminal device as the transmission parameter type corresponding to the first transmission mode, wherein the first type of transmission parameters are for the OAM based transmission mode and the second type of transmission parameters are for the MIMO based transmission mode.

Optionally, in some implementations, the transmission parameters configured at the terminal device are part of the first type of transmission parameters, and/or the transmission parameters configured at the terminal device are part of the second type of transmission parameters.

Optionally, in some implementations, the method 300 further includes: the network device sending second information to the terminal device, wherein the second information is used to indicate another part of transmission parameters of the transmission parameter type corresponding to the first transmission mode.

Optionally, in some implementations, the method 300 further includes: the network device sending third information to the terminal device, wherein the third information is used to configure the first type of transmission parameters and the second type of transmission parameters.

Optionally, in some implementations, the third information is carried in a broadcast message or in at least one of MAC CE signaling, DCI and RRC signaling.

Optionally, in some implementations, the second information is carried in a broadcast message or in at least one of MAC CE, DCI and RRC signaling.

Optionally, in some implementations, the first information is carried in a broadcast message or in at least one of MAC CE, DCI and RRC signaling.

Optionally, in some implementations, the method 300 further includes: the network device receiving fourth information sent by the terminal device, wherein the fourth information is used to indicate whether the terminal device supports the OAM based transmission mode, or whether the terminal device is capable of transmitting data based on the first type of transmission parameters, the first type of transmission parameters is for the OAM based transmission mode.

The network device determining that the terminal device uses the first transmission mode to transmit data includes: the network device determining, according to the fourth information, that the terminal device uses the first transmission mode to transmit data.

Optionally, in some implementations, the fourth information is carried in at least one of the following: capability report information, the first piece of information in two-step random access, the first or third piece of information in four-step random access, RRC dedicated signaling, and UCI.

Optionally, in some implementations, the method 300 further includes: the network device receiving fifth information sent by the terminal device, wherein the fifth information is used to indicate that the terminal device determines to use the first transmission mode to transmit data, or the fifth information is used to indicate that the terminal device transmits data based on the transmission parameter type corresponding to the first transmission mode.

The network device determining that the terminal device uses the first transmission mode to transmit data includes: the network device determining, according to the fifth information, that the terminal device uses the first transmission mode to transmit data.

Optionally, in some implementations, the method 300 further includes: the terminal device sending sixth information to the terminal device, wherein the sixth information is used to indicate the transmission parameters corresponding to the first transmission mode.

Optionally, in some implementations, the fifth information is carried in at least one of the following: capability report information, the first piece of information in two-step random access, the first or third piece of information in four-step random access, RRC dedicated signaling, and UCI.

Optionally, in some implementations, the sixth information is carried in a broadcast message or in at least one of MAC CE, DCI and RRC signaling.

Therefore, in an implementation of the present disclosure, the data transmission mode can be determined when the MIMO based transmission mode and the OAM based transmission mode coexist.

In addition, in one aspect, it is ensured that the network side and the terminal side have a consistent understanding of a data transmission mode and parameter configuration information in the future communication system, which prevents the communication failure caused by differences in understanding of communication modes. In another aspect, considering that there will be a large number of devices that support OAM capability and devices that do not support OAM capability coexist in the communication system, the corresponding service types are provided for different types of devices by means of capability reporting, which improves the user experience and the overall network performance.

Method implementations of the present disclosure are described in detail above with reference to FIGS. 2 to 11, device implementations of the present disclosure will be described in detail below with reference to FIGS. 12 to 16. It should be understood that the device implementations and the method implementations correspond to each other, and description of the method implementations may be referred to for similar description of the apparatus implementations.

Figure 12:
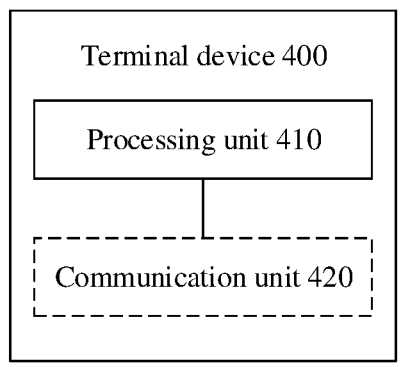
FIG. 12 is a schematic block diagram of a terminal device according to an implementation of the present disclosure.

FIG. 12 is a schematic block diagram of a terminal device 400 according to an implementation of the present disclosure. As shown in FIG. 12, a terminal device 400 includes a processing unit 410.

The processing unit 410 is configured to determine to use a first transmission mode to transmit data, wherein the first transmission mode is a Multiple-Input Multiple-Output (MIMO) or an Orbital Angular Momentum (OAM) based transmission mode.

Optionally, the terminal device 400 further includes a communication unit 420, which is configured to receive first information, wherein the first information is used to indicate the first transmission mode or a transmission parameter type corresponding to the first transmission mode; and the processing unit 410 is specifically configured to: according to the first information, determine to use the first transmission mode to transmit data.

Optionally, the communication unit 420 is further configured to receive second information, which is used to indicate transmission parameters corresponding to the first transmission mode.

Optionally, the processing unit 410 is further configured to analyze the second information according to the first information.

Optionally, the first information and the second information are carried in the same signaling or broadcast message.

Optionally, the first information and the second information are respectively carried in different signaling or broadcast messages.

Optionally, the processing unit 410 is further configured to determine, according to the first information, valid or activated transmission parameters in a first type of transmission parameters and a second type of transmission parameters configured at the terminal device, as the transmission parameter type corresponding to the first transmission mode, wherein the first type of transmission parameters are for the OAM based transmission mode and the second type of transmission parameters are for the MIMO based transmission mode.

Optionally, transmission parameters configured at the terminal device are part of the first type of transmission parameters, and/or transmission parameters configured at the terminal device are part of the second type of transmission parameters.

Optionally, the terminal device 400 further includes a communication unit 420, which is configured to receive second information, which is used to indicate another part of transmission parameters of the transmission parameter type corresponding to the first transmission mode.

Optionally, the communication unit 420 is further configured to receive third information, which is used to configure the first type of transmission parameters and the second type of transmission parameters.

Optionally, the third information is carried in a broadcast message, or the third information is carried in at least one of Media Access Control Control Element MAC CE signaling, Downlink Control Information DCI and Radio Resource Control RRC signaling.

Optionally, the second information is carried in a broadcast message, or the second information is carried in at least one of MAC CE, DCI and RRC signaling.

Optionally, the first information is carried in a broadcast message, or the first information is carried in at least one of MAC CE, DCI and RRC signaling.

Optionally, the terminal device 400 further includes a communication unit 420, which is configured to send fourth information, wherein the fourth information is used to indicate whether the terminal device supports the OAM based transmission mode, or whether the terminal device is capable of transmitting data based on the first type of transmission parameters, the first type of transmission parameters is for the OAM based transmission mode.

Optionally, the fourth information is carried in at least one of the following: capability report information, the first piece of information in two-step random access, the first or third piece of information in four-step random access, RRC dedicated signaling, and Uplink Control Information UCI.

Optionally, the terminal device 400 further includes a communication unit 420.

The communication unit 420 is configured to send fifth information, wherein the fifth information is used to indicate that the terminal device determines to use the first transmission mode to transmit data, or the fifth information is used to indicate that the terminal device transmits data based on the transmission parameter type corresponding to the first transmission mode.

Optionally, the communication unit 420 is further configured to receive sixth information, which is used to indicate the transmission parameters corresponding to the first transmission mode.

Optionally, the fifth information is carried in at least one of the following: capability report information, the first piece of information in two-step random access, the first or third piece of information in four-step random access, RRC dedicated signaling, and Uplink Control Information UCI.

Optionally, the sixth information is carried in a broadcast message or in at least one of MAC CE, DCI and RRC signaling.

Optionally, in some implementations, the communication unit may be a communication interface or transceiver, or an input/output interface of a communication chip or a system on a chip. The above processing unit may be one or more processors.

It should be understood that the terminal device 400 according to an implementation of the present disclosure may correspond to the terminal device in the method implementation of the present disclosure, and the above-mentioned and other operations and/or functions of various units in the terminal device 400 are respectively used for implementing the corresponding processes of the terminal device in the method 200 shown in FIG. 2, which will not be repeated here for brevity.

Figure 13:
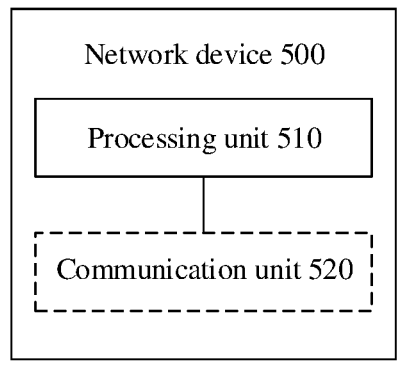
FIG. 13 is a schematic block diagram of a network device according to an implementation of the present disclosure.

FIG. 13 shows a schematic block diagram of a network device 500 according to an implementation of the present disclosure. As shown in FIG. 13, the network device 500 includes a processing unit 510.

The processing unit 510 is configured to determine that a terminal device uses a first transmission mode to transmit data, wherein the first transmission mode is a Multiple-Input Multiple-Output (MIMO) or an Orbital Angular Momentum (OAM) based transmission mode.

Optionally, the network device 500 further includes a communication unit 520, which is configured to send first information to the terminal device, wherein the first information is used to indicate the first transmission mode or a transmission parameter type corresponding to the first transmission mode.

Optionally, the communication unit 520 is further configured to send second information to the terminal device, wherein the second information is used to indicate transmission parameters corresponding to the first transmission mode.

Optionally, the first information is further used by the terminal device to analyze the second information.

Optionally, the first information and the second information are carried in the same signaling or broadcast message.

Optionally, the first information and the second information are respectively carried in different signaling or broadcast messages.

Optionally, the first information is also used by the terminal device to determine valid or activated transmission parameters in a first type of transmission parameters and a second type of transmission parameters configured at the terminal device, as the transmission parameter type corresponding to the first transmission mode, wherein the first type of transmission parameters are for the OAM based transmission mode and the second type of transmission parameters are for the MIMO based transmission mode.

Optionally, transmission parameters configured at the terminal device are part of the first type of transmission parameters, and/or transmission parameters configured at the terminal device are part of the second type of transmission parameters.

Optionally, the communication unit 520 is further configured to send second information to the terminal device, wherein the second information is used to indicate another part of transmission parameters of the transmission parameter type corresponding to the first transmission mode.

Optionally, the communication unit 520 is further configured to send third information to the terminal device, wherein the third information is used to configure the first type of transmission parameters and the second type of transmission parameters.

Optionally, the third information is carried in a broadcast message, or the third information is carried in at least one of Media Access Control Control Element MAC CE signaling, Downlink Control Information DCI and Radio Resource Control RRC signaling.

Optionally, the second information is carried in a broadcast message, or the second information is carried in at least one of MAC CE, DCI and RRC signaling.

Optionally, the first information is carried in a broadcast message, or the first information is carried in at least one of MAC CE, DCI and RRC signaling.

Optionally, the network device 500 further includes a communication unit 520, which is configured to receive fourth information sent by the terminal device, wherein the fourth information is used to indicate whether the terminal device supports the OAM based transmission mode, or whether the terminal device is capable of transmitting data based on the first type of transmission parameters, which are for the OAM based transmission mode.

The processing unit 510 is specifically configured to: determine, according to the fourth information, that the terminal device uses the first transmission mode to transmit data.

Optionally, the fourth information is carried in at least one of the following: capability report information, the first piece of information in two-step random access, the first or third piece of information in four-step random access, RRC dedicated signaling, and Uplink Control Information UCI.

Optionally, the network device 500 further includes a communication unit 520, which is further configured to receive the fifth information sent by the terminal device, wherein the fifth information is used to indicate that the terminal device determines to use the first transmission mode to transmit data, or the fifth information is used to indicate that the terminal device transmits data based on the transmission parameter type corresponding to the first transmission mode.

The processing unit 510 is specifically configured to: determine, according to the fifth information, that the terminal device uses the first transmission mode to transmit data.

Optionally, the communication unit 520 is further configured to send sixth information to the terminal device, wherein the sixth information is used to indicate the transmission parameters corresponding to the first transmission mode.

Optionally, the fifth information is carried in at least one of the following: capability report information, the first piece of information in two-step random access, the first or third piece of information in four-step random access, RRC dedicated signaling, and Uplink Control Information UCI.

Optionally, the sixth information is carried in a broadcast message or in at least one of MAC CE, DCI and RRC signaling.

Optionally, in some implementations, the communication unit may be a communication interface or transceiver, or an input/output interface of a communication chip or a system on a chip. The above processing unit may be one or more processors.

It should be understood that the network device 500 according to an implementation of the present disclosure may correspond to the network device in the method implementation of the present disclosure, and the above-mentioned and other operations and/or functions of various units in the network device 500 are respectively used for implementing the corresponding processes of the network device in the method 300 shown in FIG. 11, which will not be repeated here for brevity.

Figure 14:
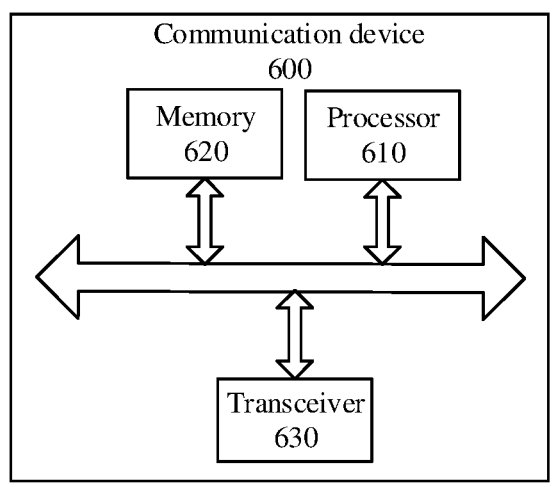
FIG. 14 is a schematic block diagram of a communication device according to an implementation of the present disclosure.

FIG. 14 is a schematic diagram of a structure of a communication device 600 according to an implementation of the present disclosure. The communication device 600 shown in FIG. 14 includes a processor 610, which may call and run a computer program from a memory to implement the methods in the implementations of the present disclosure.

Optionally, as shown in FIG. 14, the communication device 600 may further include a memory 620. Herein, the processor 610 may call and run a computer program from the memory 620 to implement the methods in the implementations of the present disclosure.

Herein, the memory 620 may be a separate device independent of the processor 610, or may be integrated in the processor 610.

Optionally, as shown in FIG. 14, the communication device 600 may further include a transceiver 630, and the processor 610 may control the transceiver 630 to communicate with another device. Specifically, the transceiver 730 may send information or data to another device or receive information or data sent by another device.

Herein, the transceiver 630 may include a transmitter and a receiver. The transceiver 630 may further include antennas, a quantity of which may be one or more.

Optionally, the communication device 600 may specifically be the network device according to the implementations of the present disclosure, and the communication device 600 may implement corresponding processes implemented by the network device in various methods in the implementations of the present disclosure, which will not be repeated here for brevity.

Optionally, the communication device 600 may be specifically the mobile terminal/terminal device according to the implementations of the present disclosure, and the communication device 600 may implement corresponding processes implemented by the mobile terminal/terminal device in various methods in the implementations of the present disclosure, which will not be repeated here for brevity.

Figure 15:
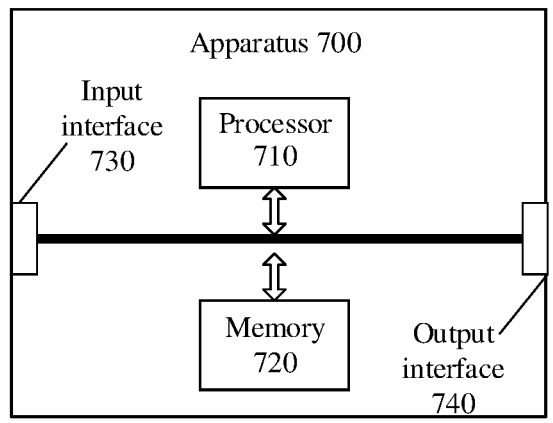
FIG. 15 is a schematic block diagram of an apparatus according to an implementation of the present disclosure.

FIG. 15 is a schematic diagram of a structure of an apparatus according to an implementation of the present disclosure. The apparatus 700 shown in FIG. 15 includes a processor 710. The processor 710 may call and run a computer program from a memory to implement the methods in the implementations of the present disclosure.

Optionally, as shown in FIG. 15, the apparatus 700 may further include a memory 720. Herein, the processor 710 may call and run a computer program from the memory 720 to implement the methods in the implementations of the present disclosure.

Herein, the memory 720 may be a separate device independent of the processor 710, or may be integrated in the processor 710.

Optionally, the apparatus 700 may further include an input interface 730. Herein, the processor 710 may control the input interface 730 to communicate with another device or chip. Specifically, the processor 410 may acquire information or data sent by another device or chip.

Optionally, the apparatus 700 may further include an output interface 740. Herein, the processor 710 may control the output interface 740 to communicate with another device or chip. Specifically, the processor 410 may output information or data to another device or chip.

Optionally, the apparatus may be applied to the network device in the implementations of the present disclosure, and the apparatus may implement corresponding processes implemented by the network device in various methods of the implementations of the present disclosure, which will not be repeated here for brevity.

Optionally, the apparatus may be applied to a mobile terminal/terminal device in the implementations of the present disclosure, and the apparatus may implement corresponding processes implemented by the mobile terminal/terminal device in various methods of the implementations of the present disclosure, which will not be repeated here for brevity.

Optionally, the apparatus mentioned in an implementation of the present disclosure may also be a chip. For example, it may be a system-level chip, a system chip, a chip system, or a system on chip, etc.

Figure 16:
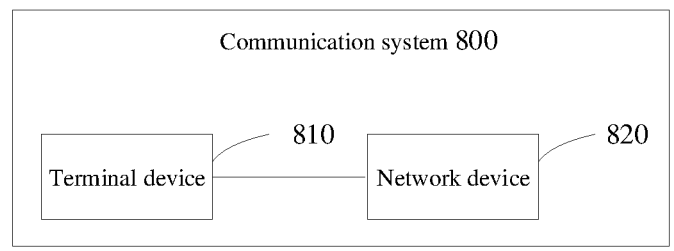
FIG. 16 is a schematic block diagram of a communication system according to an implementation of the present disclosure.

FIG. 16 is a schematic block diagram of a communication system 800 according to an implementation of the present disclosure. As shown in FIG. 16, the communication system 800 includes a terminal device 810 and a network device 820.

The terminal device 810 may be configured to implement corresponding functions implemented by the terminal device in the above-mentioned methods, and the network device 820 may be configured to implement corresponding functions implemented by the network device in the above-mentioned methods, which will not be repeated here for brevity.

It should be understood that the processor in the implementations of the present disclosure may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement various methods, acts, and logic block diagrams disclosed in the implementations of the present disclosure. The general purpose processor may be a microprocessor or the processor may be any conventional processor or the like. The acts of the methods disclosed in connection with the implementations of the present disclosure may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and a processor reads information in the memory and completes the acts of the above methods in combination with its hardware.

It should be understood that the memory in the implementations of the present disclosure may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration and should not be construed as limitations. For example, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is to say, the memories in the implementations of the present disclosure are intended to include, but are not limited to, these and any other suitable types of memories.

An implementation of the present disclosure further provides a computer readable storage medium, configured to store a computer program.

Optionally, the computer readable storage medium may be applied to a network device in an implementation of the present disclosure, and the computer program enables a computer to perform corresponding processes implemented by the network device in various methods according to the implementations of the present disclosure, which will not be repeated here for brevity.

Optionally, the computer readable storage medium may be applied to the mobile terminal/terminal device in the implementations of the present disclosure, and the computer program enables a computer to perform corresponding processes implemented by the mobile terminal/terminal device in various methods according to the implementations of the present disclosure, which will not be repeated here for brevity.

An implementation of the present disclosure further provides a computer program product, including computer program instructions.

Optionally, the computer program product may be applied to a network device in an implementation of the present disclosure, and the computer program instructions enable a computer to perform corresponding processes implemented by the network device in various methods according to the implementations of the present disclosure, which will not be repeated here for brevity.

Optionally, the computer program product may be applied to the mobile terminal/terminal device in the implementations of the present disclosure, and the computer program instructions enable a computer to perform corresponding processes implemented by the mobile terminal/terminal device in various methods according to the implementations of the present disclosure, which will not be repeated here for brevity.

An implementation of the present disclosure further provides a computer program.

Optionally, the computer program may be applied to a network device in an implementation of the present disclosure. When the computer program is run on a computer, the computer is enabled to perform corresponding processes implemented by the network device in various methods according to the implementations of the present disclosure, which will not be repeated here for brevity.

Optionally, the computer program may be applied to the mobile terminal/terminal device in the implementations of the present disclosure. When the computer program is run on a computer, the computer is enabled to perform corresponding processes implemented by the mobile terminal/terminal device in various methods according to the implementations of the present disclosure, which will not be repeated here for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present disclosure.

Those skilled in the art may clearly understand that for convenience and conciseness of description, specific working processes of the systems, apparatuses, and units described above may refer to corresponding processes in the aforementioned method implementations, and details will not be repeated here.

In several implementations according to the present disclosure, it should be understood that the disclosed systems, apparatuses, and methods may be implemented in other ways. For example, the apparatus implementations described above are only illustrative. For example, a division of the units is only a division of logical functions, but there may be other division manners in actual implementations. For example, multiple units or components may be combined or integrated into another system, or some features may be ignored or not executed. In addition, mutual coupling or direct coupling or communication connection shown or discussed may be indirect coupling or communication connection between apparatuses or units through some interfaces, and may be in electrical, mechanical, or in other forms.

The units described as separated components may or may not be physically separated, and components shown as units may or may not be physical units, i.e., they may be located in one place or may be distributed over multiple network units. Some or all of the units may be selected according to practical needs to achieve purposes of solutions of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Regarding such understanding, a technical solution of the present disclosure, in essence, or a part contributing to the prior art, or a part of the technical solution, may be embodied in a form of a software product, herein the computer software product is stored in a storage medium, and includes several instructions for enabling a computer device (which may be a personal computer, a server, or a network device, or the like) to perform all or part of the acts of the methods described in various implementations of the present disclosure. And the aforementioned storage medium includes: various media, such as a U disk, a mobile hard disk, a Read-Only Memory (ROM), a Random Access Memory (RAM), a magnetic disk, or an optical disk, etc., which may store program codes.

The foregoing are merely specific implementations of the present disclosure, but the protection scope of the present disclosure is not limited thereto. Any person skilled in the art may readily conceive variations or substitutions within the technical scope disclosed by the present disclosure, which should be included within the protection scope of the present disclosure. Therefore, the protection scope of the present disclosure should be subject to the protection scope of claims.

What is claimed is:

1. A terminal device, comprising a processor and a transceiver, wherein the processor is configured to determine to use a first transmission mode to transmit data, wherein the first transmission mode is a Multiple-Input Multiple-Output (MIMO) based transmission mode or an Orbital Angular Momentum (OAM) based transmission mode,
- wherein the transceiver is configured to receive first information, wherein the first information is used for indicating the first transmission mode or a transmission parameter type corresponding to the first transmission mode,
- wherein the processor is further configured to determine to use the first transmission mode to transmit data according to the first information, and
- wherein the transceiver is further configured to receive second information, wherein the second information is used for indicating transmission parameters corresponding to the first transmission mode.

2. The terminal device of claim 1, wherein the processor is further configured to analyze the second information according to the first information.

3. The terminal device of claim 1, wherein the first information and the second information are carried in the same signaling or broadcast message.

4. The terminal device of claim 1, wherein the first information and the second information are carried in different signaling or broadcast messages respectively.

5. The terminal device of claim 1, wherein the processor is further configured to, determine, according to the first information, valid or activated transmission parameters in a first type of transmission parameters and a second type of transmission parameters configured at the terminal device, as the transmission parameter type corresponding to the first transmission mode, wherein the first type of transmission parameters are for the OAM based transmission mode and the second type of transmission parameters are for the MIMO based transmission mode.

6. The terminal device of claim 5, wherein transmission parameters configured at the terminal device are part of the first type of transmission parameters, and/or transmission parameters configured at the terminal device are part of the second type of transmission parameters.

7. The terminal device of claim 6, wherein the transceiver is configured to receive second information, wherein the second information is used for indicating another part of transmission parameters of the transmission parameter type corresponding to the first transmission mode.

8. The terminal device of claim 5, wherein the transceiver is further configured to receive third information, wherein the third information is used for configuring the first type of transmission parameters and the second type of transmission parameters.

9. The terminal device of claim 8, wherein the third information is carried in a broadcast message, or the third information is carried in at least one of Media Access Control Control Element MAC CE signaling, Downlink Control Information DCI, and Radio Resource Control RRC signaling.

10. The terminal device of claim 1, wherein the second information is carried in a broadcast message or the second information is carried in at least one of MAC CE, DCI, and RRC signaling.

11. The terminal device of claim 1, wherein the first information is carried in a broadcast message or the first information is carried in at least one of MAC CE, DCI, and RRC signaling.

12. The terminal device of claim 1, wherein the transceiver is configured to send fourth information, wherein the fourth information is used for indicating whether the terminal device supports the OAM based transmission mode, or the fourth information is used for indicating whether the terminal device is capable of transmitting data based on the first type of transmission parameters, the first type of transmission parameters is for the OAM based transmission mode.

13. The terminal device of claim 12, wherein the fourth information is carried in at least one of the following:
- capability report information, a first piece of information in two-step random access, a first or third piece of information in four-step random access, RRC dedicated signaling, or Uplink Control Information UCI.

14. The terminal device of claim 1, wherein the transceiver is configured to send fifth information, wherein the fifth information is used for indicating that the terminal device determines to use the first transmission mode to transmit data, or the fifth information is used for indicating that the terminal device transmits data based on the transmission parameter type corresponding to the first transmission mode.

15. The terminal device of claim 14, wherein the transceiver is further configured to receive sixth information, wherein the sixth information is used for indicating the transmission parameters corresponding to the first transmission mode.

16. The terminal device of claim 14, wherein the fifth information is carried in at least one of the following:
- capability report information, a first piece of information in two-step random access, a first or third piece of information in four-step random access, RRC dedicated signaling, and Uplink Control Information UCI,
- wherein the sixth information is carried in a broadcast message, or the sixth information is carried in at least one of MAC CE, DCI, and RRC signaling.

17. A network device, comprising a processor and a transceiver, wherein the processor is configured to determine that a terminal device uses a first transmission mode to transmit data, wherein the first transmission mode is a Multiple-Input Multiple-Output (MIMO) based transmission mode or an Orbital Angular Momentum (OAM) based transmission mode,
- wherein the transceiver is configured to send first information to the terminal device, wherein the first information is used for indicating the first transmission mode or a transmission parameter type corresponding to the first transmission mode, and
- wherein the transceiver is further configured to send second information to the terminal device, wherein the second information is used for indicating transmission parameters corresponding to the first transmission mode.

18. A method for wireless communication, comprising:
- receiving, by a terminal device, first information, wherein the first information is used for indicating a first transmission mode or a transmission parameter type corresponding to the first transmission mode;
- determining, by the terminal device, to use the first transmission mode to transmit data according to the first information, wherein the first transmission mode is a Multiple-Input Multiple-Output (MIMO) based transmission mode or an Orbital Angular Momentum (OAM) based transmission mode; and
- receiving, by the terminal device, second information, wherein the second information is used for indicating transmission parameters corresponding to the first transmission mode.

* * * * *